United States Patent
Ho et al.

(10) Patent No.: US 7,778,493 B2
(45) Date of Patent: Aug. 17, 2010

(54) PIXELATION RECONSTRUCTION FOR IMAGE RESOLUTION AND IMAGE DATA TRANSMISSION

(75) Inventors: Vincent B. Ho, North Bethesda, MD (US); Micah D. Schmidt, San Antonio, TX (US)

(73) Assignee: The Henry M. Jackson Foundation for the Advancement of Military Medicine Inc., Rockville, MD (US)

( * ) Notice: Subject to any disclaimer, the term of this patent is extended or adjusted under 35 U.S.C. 154(b) by 1150 days.

(21) Appl. No.: 10/686,194

(22) Filed: Oct. 9, 2003

(65) Prior Publication Data

US 2005/0078882 A1    Apr. 14, 2005

(51) Int. Cl.
*G06K 9/32* (2006.01)
(52) U.S. Cl. .................... 382/299; 382/131; 382/284
(58) Field of Classification Search ............... 382/131, 382/284, 294, 299, 234, 254, 451
See application file for complete search history.

(56) References Cited

U.S. PATENT DOCUMENTS

| | | | | |
|---|---|---|---|---|
| 4,127,873 A | * | 11/1978 | Katagi | 375/240.01 |
| 4,907,152 A | * | 3/1990 | Lempriere | 382/131 |
| 5,073,858 A | | 12/1991 | Mills | |
| 5,301,037 A | * | 4/1994 | Kang et al. | 358/451 |

(Continued)

FOREIGN PATENT DOCUMENTS

JP         10-69537         3/1998

(Continued)

OTHER PUBLICATIONS

Borman, Sean, et al., "Spacial Resolution Enhancement of Low-Resolution Image Sequences, A Comprehensive Review with Directions for Future Research," *Tech. Rep.*, University of Notre Dame, pp. i-x and 1-53 (1998).

(Continued)

*Primary Examiner*—Daniel G Mariam
*Assistant Examiner*—Aklilu K Woldemariam
(74) *Attorney, Agent, or Firm*—Morgan, Lewis & Bockius LLP

(57) ABSTRACT

Methods for improving spatial and/or temporal resolution of digital images and for improving image data transmission by a novel technique—back pixelation, which involves data processing and reconstruction of overlaid images from multiple acquisition or multiple sampling. The back pixelation technique may be used for image data acquisition and transmission; it may be applied prospectively or retrospectively. In particular, the methods of this invention may be used in reducing the pixel size of a two-dimensional image or the voxel size of a three dimensional image; producing a two- or three-dimensional image from a multiplicity of images acquired from an object which are capable of overlaying one another by an increment; producing and transmitting a two- or three-dimensional image by multiple acquisitions according to an acquisition matrix; or transmitting a two- or three-dimensional image by reducing or decomposing the image to a plurality of image data packets and transmitting the same. The multiple acquisitions may be arranged by a predetermined temporal schedule. These methods may be advantageously applied in medical imaging, movies and video games, teleimage, and any other areas that involve digital image acquisition, processing, and transmission.

55 Claims, 4 Drawing Sheets

U.S. PATENT DOCUMENTS

| | | | |
|---|---|---|---|
| 5,355,443 A | 10/1994 | Kim et al. | |
| 5,363,213 A * | 11/1994 | Coward et al. | 382/299 |
| 5,437,045 A * | 7/1995 | Davies | 712/16 |
| 5,696,848 A * | 12/1997 | Patti et al. | 382/254 |
| 5,768,403 A * | 6/1998 | Suzuki et al. | 358/2.1 |
| 5,873,830 A * | 2/1999 | Hossack et al. | 600/447 |
| 5,923,789 A | 7/1999 | Avinash | |
| 6,018,600 A * | 1/2000 | Levin et al. | 382/284 |
| 6,073,042 A | 6/2000 | Simonetti | |
| 6,078,638 A * | 6/2000 | Sauer et al. | 378/4 |
| 6,196,715 B1 * | 3/2001 | Nambu et al. | 378/197 |
| 6,208,765 B1 | 3/2001 | Bergen | |
| 6,285,804 B1 * | 9/2001 | Crinon et al. | 382/299 |
| 6,356,555 B1 * | 3/2002 | Rakib et al. | 370/441 |
| 6,804,419 B1 | 10/2004 | Miyake | |
| 6,806,888 B2 * | 10/2004 | Bhogal et al. | 345/660 |
| 6,885,776 B2 * | 4/2005 | Takakura et al. | 382/284 |
| 7,084,837 B2 * | 8/2006 | Sotoda et al. | 345/3.1 |
| 7,123,780 B2 * | 10/2006 | Carrig | 382/299 |
| 7,200,259 B1 * | 4/2007 | Gold et al. | 382/149 |
| 2001/0015956 A1 * | 8/2001 | Ono | 370/229 |
| 2002/0008887 A1 * | 1/2002 | Horikoshi et al. | 359/9 |
| 2003/0123380 A1 * | 7/2003 | Waldman et al. | 369/275.4 |
| 2004/0025000 A1 * | 2/2004 | Wise et al. | 712/300 |
| 2005/0243109 A1 * | 11/2005 | Stevens | 345/694 |

FOREIGN PATENT DOCUMENTS

| | | |
|---|---|---|
| JP | 11-151224 | 6/1999 |
| JP | 2000-244851 | 9/2000 |

OTHER PUBLICATIONS

C. Jacquemod, et al., "Image Resolution Enhancement Using Subpixel Camera Displacement," *Signal Processing*, 26:139-146 (1992).

Peled, Sharon et al., "Superresolution in MRI: Application to Human White Matter Fiber Tract Visualization by Diffussion Tensor Imaging," *Magnetic Resonance in Medicine*, 45:29-35 (2001).

Ur, Hanoch, et al., "Improved Resolution from Subpixel Shifted Pictures," *Graphical Models and Image Processing*, 54(2):181-186 (1992).

Greenspan, H., et al., "MRI Inter-slice Reconstruction Using Super-Resolution," *Magnetic Resonance Imaging*, 20:437-446 (2002).

Greenspan, Hayit, et al., "Medical Image Computing and Computer-Assisted Intervention—MICCA 2001," Fourth International Conference on Medical Image Computing and Computer-Assisted Intervention. Abstract, *Lecture Notes in Computer Science* (2001).

Elad, et al. "Restoration of a Single Superresolution Image for Several Blurred, Noisy, and Undersampled Measure Images", IEEE Transactions on Image Processing, vol. 12, Dec. 1997.

* cited by examiner

PIXELATION RECONSTRUCTION FOR IMAGE RESOLUTION AND IMAGE DATA TRANSMISSION

REFERENCE TO RELATED APPLICATIONS

This application claims priority to U.S. Provisional Application No. 60/350,384, filed Jan. 24, 2001, and International Application No. PCT/US02/10994, filed Apr. 9, 2002, both entitled "Pixelation Reconstruction for Image Resolution and Image Data."

BACKGROUND OF THE INVENTION

1. Field of the Invention

The present invention relates in general to digital image processing. Specifically, the present invention relates to methods for improving image resolution and improving image data transmission in medical imaging, movies and video games, teleimage, and any other areas involving digital image acquisition and transmission. More specifically, the present invention provides methods for increasing image resolution—spatially and/or temporally—and methods for transmitting image data using back pixelation, a technique that involves data processing and reconstruction of overlaid images from multiple acquisitions or multiple sampling.

2. Description of the Related Art

In the contemporary digital age, digital image processing is taking an increasingly essential part in medical diagnostics, telecommunication, entertainment (e.g. movies and video games), and scientific research and development. Resolution of digital images directly affects their quality and application. Improving image resolution—spatially and/or temporarily—is a continuous challenge to the engineers, researchers, and practitioners alike. Improving image resolution without increasing the capacity of hardware imaging acquisition instruments is particularly challenging. Magnetic resonance imaging (MRI), for example, is such an area where these challenges are keenly felt by clinicians and medical engineers.

MRI measures the radio frequency response ("signal") of the target tissue to radio frequency waves generated by the magnetic resonance (MR) scanner; such response or signal is delineated by a MR pulse sequence. The pulse sequence determines the image contrast, the speed of image acquisition, and the spatial resolution of the resulting MR image. The maximal spatial and temporal resolutions are limited by the strength of the magnetic field and the scanner's gradient hardware.

High resolution scanning is desired for better morphologic depiction and lesion characterization. Low spatial resolution on one or more dimensions (i.e. large pixel or voxel size) may cause a partial volume effect that results in poor differentiation of structures. That is, clinically relevant information may be masked if a lesion is mixed with other tissue(s) in the space represented by a single pixel or voxel. See, e.g., Schreiner, S.; et al, Journal of Computer Assisted Tomography 20(1):56-67. In order to depict a lesion at an accepted confident level thereby preventing diagnostic errors, the pixel or voxel size needs to be no larger than half the size of the lesion. See, Id. High spatial resolution for acquiring images is thus vital in these situations.

Clinical imaging such as MRI also requires a balance between temporal resolution and spatial resolution, the later represented by the pixel or voxel size and the former the scan time. Fast acquisition or high temporal resolution is important for reducing the length of the exam time and the overall exam cost; and more importantly, it is critical in assessing dynamic changes and monitoring structures in real-time imaging, especially during the use of contrast agents for tissue and organ perfusion imaging. However, fast imaging is often performed at the expense of spatial resolution. That is, for example, imaging a fixed field of view (FOV) with a 128×128 matrix may be performed more quickly than with a 256×256 matrix, but the resulting lower spatial resolution information of the 128×128 acquisition may be insufficient for confident diagnosis of structures. The 256×256 acquisition—or the spatial resolution achieved thereby—may be required for structural identification and depiction. Yet, a 256×256 image requires a longer acquisition period, yielding a lower temporal resolution, and hence its diagnostic utility for dynamic or real time imaging may be limited, e.g., in the cases where contrast media enhancement is evaluated for medical diagnosis.

One further consideration is that of signal-to-noise ratio (S/N), which must also be sufficient for adequate differentiation of certain structural features. In the case of the 256×256 matrix, for example, the spatial resolution achieved may be sufficient for depiction of a target structure but the S/N of the relatively small voxel or pixel size may be insufficient for actual visualization of the structures. Whereas, a 128×128 matrix (with a larger pixel or voxel size) may be performed quicker and yields a higher S/N per pixel or per voxel. In general, therefore, high spatial resolution, high temporal resolution, and high S/N are all preferable for MRI; however, they often represent competing factors in image acquisition that call for appropriate balancing.

A high S/N is necessary for visualizing small structures in MRI. S/Ns may be improved by a variety of methods such as increasing the number of excitation averages, decreasing the receiver bandwidth, or increasing the acquisition repetition time. These methods improve S/N but slow image acquisition, thus result in decreased temporal resolution. On the other hand, S/N may be compromised by decreasing pixel or voxel size, which marks improved spatial resolution.

The interplay of spatial resolution, temporal resolution, and S/N, therefore, poses significant challenge for optimizing all the parameters to achieve desired imaging results in different applications. One way to increase spatial resolution is to apply higher magnetic field strength (e.g. 1.5, 2, 3, and 3 Tesla versus 0.035 or 0.3 Tesla) and high performance gradient sets (e.g. 40-60 mT/m versus 5-10 mT/m); these disparate parameters dictate achievable matrix sizes (x and y dimensions) and slice thickness (z dimension). Increasing hardware capacity as such often associates with high cost.

Certain post-processing techniques, such as zero-filled interpolation and voxel shift interpolation, have been proposed to address spatial resolution related partial volume effect problem in some applications. See, e.g., Du Y. et al., JMRI September/October 1994 p. 733-741. However, these filtering methods do not inherently improve spatial resolution; the method of Du et al., for example, only interpolates intermediate voxels. These methods can not, nor can other existing image processing or restoration methods, accurately determine a signal that would be returned from a portion of tissues with a size smaller than one pixel or one voxel.

Additionally, the size of a digital image in application areas such as medical imaging is typically fairly large such that the transmission of such images poses a significant challenge on transmission capacity. To achieve satisfactory resolution after transmission is a lasting battle for the engineers and researchers alike. Certain data segmentation, compression, or reduction techniques have been used (e.g., preserving every fourth point of the image). But, they may result in voids in the transmitted image and therefore may not be desirable in some situations where high image integrity is required.

There is therefore a need for methods that effectively improve and optimally balance spatial and temporal resolution of digital images on acquisition and efficiently transmit the same at a satisfactory resolution in various application areas, especially those that do not demand enhancement of imaging acquisition capacities of equipment and/or hardware.

SUMMARY OF THE INVENTION

It is therefore an object of this invention to provide methods for improving spatial and temporal resolution of digital images without enhancing the power of imaging acquisition instruments, such as magnetic resonance imaging machines. It is another object of this invention to provide methods for improving image data transmission. Particularly, the methods of this invention improve image resolution and image transmission using a novel technique—back pixelation—which involves data processing and reconstruction of overlaid images from multiple acquisitions or multiple sampling.

In accordance with the present invention, there is provided, in one embodiment, a method for improving resolution of a two-dimensional image capable of being acquired from an object at a first pixel size, comprising: defining a sampling region for producing the image at a second pixel size, the second pixel size being no larger than the first pixel size; sampling, with an overlapping increment, the sampling region thereby producing a multiplicity of sample layers, the overlapping increment being no larger than the first pixel size thereby determining the second pixel size; obtaining values of the pixels of the second pixel size in each of the multiplicity of sample layers; computing the value of each pixel of the second pixel size from the values of the corresponding pixels in the multiplicity of the sample layers, thereby producing an intermediate image; and dividing, in the Fourier domain, the intermediate image by a filtering function thereby producing the image at the second pixel size, the filter function being capable of representing artifacts from the multiple sampling.

In accordance with the present invention, there is provided, in another embodiment, a method for improving resolution of a three-dimensional image capable of being acquired from an object at a first voxel size, comprising: defining a sampling space for producing the image at a second voxel size, the second voxel size being no larger than the first voxel size; sampling, with an overlapping increment, the sampling space thereby producing a multiplicity of sample areas, the overlapping increment being no larger than the first voxel size thereby determining the second voxel size; obtaining values of the voxels of the second voxel size in each of the multiplicity of sample areas; computing the value of each voxel of the second voxel size from the values of the corresponding voxels in the multiplicity of the sample areas, thereby producing an intermediate image; and dividing, in the Fourier domain, the intermediate image by a filtering function thereby producing the image at the second voxel size, the filter function being capable of representing artifacts from the multiple sampling.

According to one embodiment of this invention, the second pixel size or the second voxel size is no larger than, respectively, the first pixel size or the first voxel size thereby determining, respectively, the second pixel size or the second voxel size. According to another embodiment, the second pixel size or the second voxel size is equal to, respectively, the overlapping increment. According to yet another embodiment, the second pixel size or the second voxel size is equal to, respectively, the first pixel size or the first voxel size divided by the multiplicity.

According to another embodiment of the invention, the filter function is a point response function. According to a particular embodiment, the point response function is defined by a multiple sampling factor, which is equal to the multiplicity.

According to yet another embodiment of the invention, the sampling is performed with an overlapping increment having a fixed or varied size.

According to still another embodiment of the invention, the overlapping increment is taken along one or more dimensions. In certain embodiments, the overlapping increment is taken equally on one or more dimensions; in other embodiments, the overlapping increment is taken unequally on one or more dimensions. In another embodiment, the overlapping increment is taken angularly, whether equally or unequally on one or more dimensions. In various embodiments, the overlapping increment is defined in terms of any kind of reference coordinates, such as Cartesian coordinates or polar coordinates.

In accordance with the present invention, there is provided, in yet another embodiment, a method for improving resolution of a two-dimensional image of an object from a plurality of images taken from the object at a first pixel size, wherein each image in the plurality is capable of overlaying one other images in the plurality at an increment, wherein the increment is no larger than the first pixel size, the method comprising: defining a region for producing the two-dimensional image at a second pixel size, the second pixel size being determined by the increment; obtaining values of the pixels of the second pixel size in each image in the plurality; computing the value of each pixel of the second pixel size from the values of the corresponding pixels in the plurality, thereby producing an intermediate image; and dividing, in the Fourier domain, the intermediate image by a filtering function thereby producing the two-dimensional image at the second pixel size, the filter function being capable of representing artifacts from the multiple overlaying.

In accordance with the present invention, there is provided, in still another embodiment, a method for improving resolution of a three-dimensional image of an object from a plurality of images taken from the object at a first voxel size, wherein each image in the plurality is capable of overlaying one other images in the plurality at an increment, wherein the increment is no larger than the first voxel size, the method comprising: defining an area for producing the three-dimensional image at a second voxel size, the second voxel size being determined by the increment; obtaining values of the voxels of the second voxel size in each image in the plurality; computing the value of each voxel of the second voxel size from the values of the corresponding voxels in the plurality, thereby producing an intermediate image; and dividing, in the Fourier domain, the intermediate image by a filtering function thereby producing the three-dimensional image at the second voxel size, the filter function being capable of representing artifacts from the multiple overlaying.

According to one embodiment of the invention, each image in the plurality overlays one other image in the plurality at an increment having a varied size and the second pixel size or the second voxel size is equal to, respectively, the smallest of the increment. According to another embodiment, the increment has a fixed size and the second pixel size or the second voxel size is equal to the respective increment. In various embodiments, the increment is defined in terms of any kind of reference coordinates, such as Cartesian coordinates or polar coordinates.

According to another embodiment of this invention, the filter function is a point response function. According to a particular embodiment, the point response function is defined by a multiple overlaying factor, which is equal to the plurality.

According to yet another embodiment of this invention, the overlaying is performed along one or more dimensions. According to still another embodiment, the overlaying is performed equally on one or more dimensions. According to a further embodiment, the overlaying is performed unequally on one or more dimensions. In another embodiment, the overlaying is performed angularly, whether equally or unequally on one or more dimensions.

In accordance with the present invention, there is provided, in a further embodiment, a method for producing a two-dimensional image of an object from multiple acquisitions using a two-dimensional acquisition matrix, wherein the acquisition matrix defines the resulting pixel size of the two-dimensional image, the method comprising: acquiring, one at a time, a multiplicity of images from the object by shifting one or more units in the acquisition matrix; obtaining values of the pixels in each image in the multiplicity; computing the value of each pixel from the values of the corresponding pixels in the multiplicity, thereby producing an intermediate image; and dividing, in the Fourier domain, the intermediate image by a filtering function thereby producing the two-dimensional image, the filter function being capable of representing artifacts from multiple acquisitions.

In accordance with the present invention, there is provided, in a still further embodiment, a method for producing and transmitting a two-dimensional image of an object from multiple acquisitions using a two-dimensional acquisition matrix, wherein the acquisition matrix defines the resulting pixel size of the two-dimensional image. The method comprises: acquiring, one at a time, a multiplicity of images from the object by shifting one or more units in the acquisition matrix; transmitting, one at a time, the multiplicity of images; obtaining values of the pixels in each transmitted image in the multiplicity; computing the value of each pixel from the values of the corresponding pixels in the multiplicity, thereby producing an intermediate image; and dividing, in the Fourier domain, the intermediate image by a filtering function thereby producing the two-dimensional image, the filter function being capable of representing artifacts from multiple acquisitions.

In accordance with the present invention, there is provided, in another embodiment, a method for producing a three-dimensional image of an object from multiple acquisitions using a three-dimensional acquisition matrix, wherein the acquisition matrix defines the resulting voxel size of the three-dimensional image, the method comprising: acquiring, one at a time, a multiplicity of images from the object by shifting one or more units in the acquisition matrix; obtaining values of the voxels in each image in the multiplicity; computing the value of each voxel from the values of the corresponding voxels in the multiplicity, thereby producing an intermediate image; and dividing, in the Fourier domain, the intermediate image by a filtering function thereby producing the three-dimensional image, the filter function being capable of representing artifacts from multiple acquisitions.

In accordance with the present invention, there is provided, in yet another embodiment, a method for producing and transmitting a three-dimensional image of an object from multiple acquisitions using a three-dimensional acquisition matrix, wherein the acquisition matrix defines the resulting voxel size of the three-dimensional image. The method comprises: acquiring, one at a time, a multiplicity of images from the object by shifting one or more units in the acquisition matrix; transmitting, one at a time, the multiplicity of images; obtaining values of the voxels in each transmitted image in the multiplicity; computing the value of each voxel from the values of the corresponding voxels in the multiplicity, thereby producing an intermediate image; and dividing, in the Fourier domain, the intermediate image by a filtering function thereby producing the two-dimensional image, the filter function being capable of representing artifacts from multiple acquisitions.

According to one embodiment of this invention, the resulting pixel size of the two-dimensional image or the resulting voxel size of the three-dimensional image is equal to the size of one or more units of the respective acquisition matrix.

According to another embodiment of this invention, the acquisition matrix comprises equally-spaced units. According to yet another embodiment, the acquisition matrix comprises unequally-spaced units. In various embodiments, the acquisition matrix is defined in terms of any kind of reference coordinates, such as Cartesian coordinates or polar coordinates.

According to still another embodiment, the multiplicity of images are acquired at defined time points over a period of time. According to a still further embodiment, one or more preliminary test acquisitions for determining the scheduling of the time points are performed. According to another embodiment, the multiplicity of images are acquired, one at a time, by shifting a decimal number of units in the acquisition matrix.

According to a further embodiment, the filter function is a point response function. In a particular embodiment, the point response function is defined by a multiple acquisition factor, which is equal to the multiplicity.

According to a still further embodiment, the acquisition matrix is adaptively determined by adjusting the unit size or scheme for the subsequent acquisitions based on assessment of variance for one or more comparators (factors or parameters to compare) for at least two prior acquisitions. In another embodiment, the one or more comparators are selected from the group consisting of pixel or voxel data, k-space data, phase data, and signal-to-noise ratio data.

According to another embodiment, the multiple acquisitions further comprises one or more preliminary test acquisitions for determining the unit size and scheme of the acquisition matrix.

In accordance with the present invention, there is provided, in still another embodiment, a method for transmitting a two-dimensional image of an object, the image having a first pixel size. The method comprises: decomposing the image into a plurality of images taken from the object, each image in the plurality being capable of overlaying one other images in the plurality at an increment; transmitting, one at a time, at least two images in the plurality; computing the value of each pixel of an intermediate image from the values of the corresponding pixels in the transmitted images in the plurality; and dividing, in the Fourier domain, the intermediate image by a filtering function thereby producing a resultant two-dimensional image having a second pixel size, the filter function being capable of representing artifacts from the multiple overlaying.

In accordance with the present invention, there is provided, in a further embodiment, a method for transmitting a three-dimensional image of an object, the image having a first voxel size. The method comprises: decomposing the image into a plurality of images taken from the object, each image in the plurality being capable of overlaying one other images in the plurality at an increment; transmitting, one at a time, at least two images in the plurality; computing the value of each voxel of an intermediate image from the values of the corresponding voxels in the transmitted images in the plurality; and dividing, in the Fourier domain, the intermediate image by a filtering function thereby producing a resultant two-dimensional image having a second voxel size, the filter function being capable of representing artifacts from the multiple overlaying.

In certain embodiments of the invention, the second pixel size is equal to the first pixel size and the second voxel size is equal to said first voxel size. According to another embodiment of the present invention, all images in the plurality is transmitted.

According to the present invention, the computing is performed by taking arithmetic means in some embodiments. In other embodiments, the computing is performed by a heuristic function or an arithmetic function according to suitable mathematics and artificial intelligence procedures.

In certain embodiments, the two-dimensional image or the three-dimensional image of this invention is selected from the group consisting of a magnetic resonance image, an image produced by a digital scanner, an image produced by a digital camera or digital video, a pathological image, a histological image, and a radiological image.

DETAIL DESCRIPTIONS OF DISCLOSURE

Brief Discussions of Relevant Terms

Figure 1:
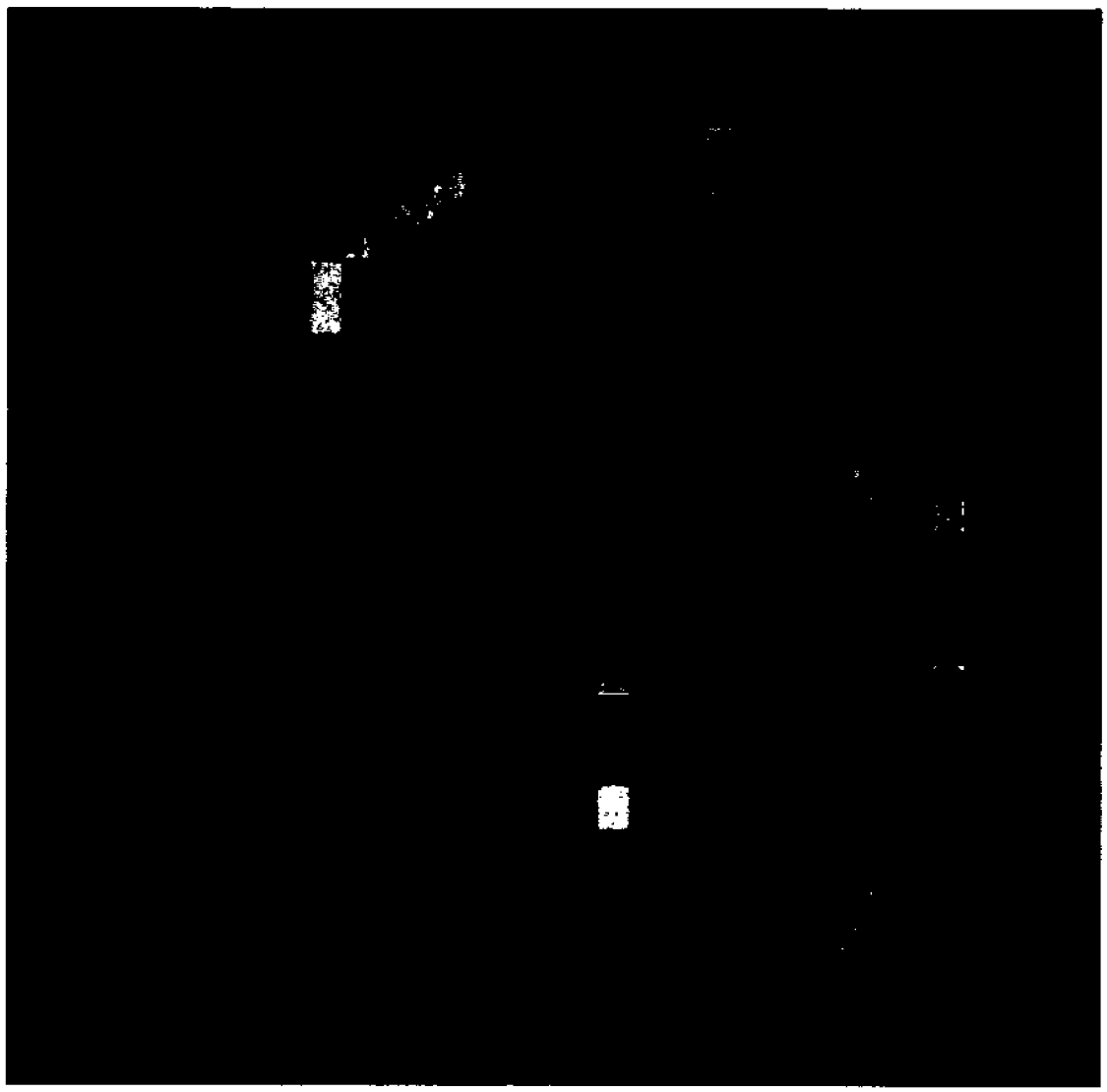
FIG. 1 depicts the initial resolution level of an image from multiple sampling in a computer simulation of image reconstruction using the back pixelation technique. The multiple sampling factor is equal to eight.

The following terms are to be understood consistently with their typical meanings established in the relevant art, i.e. the art of physics, medicine, physiology, radiology, pathology, computer sciences, mathematics, and any areas related thereto.

A digital image, as used herein, may be a two-dimensional image or a three-dimensional image; it may be captured or acquired by a digital device such as a digital camera or video, a digital scanner, a MRI scanner, or transformed from a conventional image through digitization process. As used herein, the term "pixel" and "voxel" are interchangeable, both referring to the discrete unit or element of a digital image that bears image data; the former is applicable when two-dimensional images are concerned whereas the later is applicable when three-dimensional images are concerned.

As used herein, the term "pixelation" refers to the summation of all data points from an object within a predetermined region or space; such summation forms a basis for a two- or three-dimensional representation of such data. The term "back pixelation" is defined herein to represent a process or technique whereby image acquisition is performed by multiple layered sampling which results in a multiplicity of images that are capable of overlaying one another by an increment and whereby the final image is derived by consolidating the multiplicity of images using mathematical computations and artificial intelligence procedures (e.g., taking arithmetic means) which derive the final pixel/voxel values as a function of the corresponding pixels or voxels in the multiplicity of images. The incremented multiple sampling and overlaying of the multiplicity of images are therefore deterministic of the quality of the resulting final image. That is, the scheduling and organization of the multiple sampling and multiple overlaying, the size and variation of the overlaying increment dictate the resultant pixel or voxel size of the final image and ultimately, the amount and reliability of the spatial and temporal information captured therein. The multiplicity is also referred to, interchangeably, as a multiple sampling factor, a multiple overlaying factor, a multiple acquisition factor, or an over-sampling factor; this number is equal to the number of times sampling (or overlaying, image acquisition) is performed and the number of images produced during sampling. The increment (or overlapping increment) refers to a shift in position in the two-dimensional or three-dimensional space, depending upon the dimensionality of the image being processed. The increment can be taken on one or more dimensions or axis (x, y, or z axis); the size of the increment may be fixed or may vary during the multiple sampling and overlaying. In certain embodiments, the increments may be taken angularly, whether equally or unequally on one or more dimensions. In alternative embodiments of this invention, the overlapping increment may be defined in terms of Cartesian coordinates or polar coordinates. The use of angular increments and/or polar coordinates may be advantageous for certain imaging applications, e.g., spiral MRI or edge detection of certain target structures.

The back pixelation process may be applied prospectively or retrospectively. For example, given a set of pre-acquired images of an object, whose relevant positions are such that they can overlay one another by an increment, a new image of the object may be constructed by overlaying the set of pre-acquired images and taking arithmetic means thereof (or performing any other suitable mathematical computations or artificial intelligence procedures according to this invention), an application of retrospective back pixelation. On the other hand, an acquisition matrix may be designed for imaging an object of interest; multiple acquisition may be performed according to the acquisition matrix, in the same manner as multiple sampling, thereby producing a multiplicity of images. The final image can then be constructed by overlaying the multiplicity of images and taking arithmetic means thereof (or performing any other suitable mathematical computations or artificial intelligence procedures according to this invention), an application of prospective back pixelation. Detailed discussions on the concept and applications of the back pixelation process are set forth in the following sections.

Multiple Sampling, Reconstruction, and Filtering

The method of this invention improves, in one embodiment, the spatial resolution of an image. That is, it reduces the pixel or voxel size; it does so not by adjusting or enhancing hardware capacities of image acquisition instruments, but by applying the back pixelation technique.

To reduce the size of a pixel or voxel or, essentially, to depict reliably a certain structural feature with a size smaller than the pixel or voxel, the initial step of back pixelation is the multiple sampling, as discussed supra. The multiple sampling is performed with an increment, preferably an increment smaller than a pixel or voxel, thereby producing a multiplicity of images, which, together, capture the feature information contained in a unit with a size of the increment which is smaller than the pixel or voxel. Thereafter, overlaying the multiplicity of images acquired as such, and consolidating the feature information by taking arithmetic means of the values of the corresponding pixel/voxels in the multiplicity of images (or performing any other suitable mathematical computations or artificial intelligence procedures according to the present invention), the resulting image manifests the feature information of the small unit and hence achieves a smaller pixel or voxel size. However, this image is ordinarily obscured by artifacts—similar to Gaussian blurs—from the overlaying reconstruction; it is an intermediate image that needs to be subject to further processing according to the present invention. A final reconstruction or filtering step is performed to remove the artifacts. The artifacts may be defined as a point response function which is used as a filtering mask. The final image is derived by dividing, in the Fourier domain, the intermediate image by the filtering mask.

The foregoing multisampling, overlaying, and reconstruction/filtering steps are described in more detail and by example using a mathematical model as follows, which references two-dimensional MR images.

The Sampling Region and Sampling Process

Consider a region R that represents an image in a two dimensional plane. For a perfect image, the resolution would be infinite and each pixel would be a point in space. Suppose the top left corner of the region R is the origin $(0,0)$.

In the process of producing a real image, the region R is sampled in such a way that the image is segmented into pixels of real size. The value of each pixel is the average value of all the points that are contained within the region defined by the pixel. In order to define these pixels it is necessary to know their size and a starting origin. In this case, a square pixel of size 1 is used. The upper left corner of the first pixel is at the origin and all of the other pixels follow in columns and rows to sample the entire region R without overlapping. Let this pixelated sample region be named $S(0,0)$. $S(0,0)$ is represented as a two dimensional array of pixel values and would be the standard output of a typical MR image. The sample region is defined by the location of its top left corner relative to the origin; in this case the top left corner is located precisely at the origin.

Resolution to be Increased

In order to accurately depict the position of a point of interest within R that is smaller than an individual pixel, the resolution of the sampling region must be increased. However, the pixel size 1 has a lower limit in MRI and therefore the resolution has an upper limit. Let this point of interest be called I. The size of I is some square with a size smaller than 1 so that the length of a side of I is $2*1/n$, where n is an over-sampling factor that is to be used to generate a system of pixel arrays from which to generate the region R with sufficient resolution to accurately display I. The factor n is determined by the minimum resolution needed to display I with a reasonable accuracy level; n determines, in turn, the number of pixel arrays that must be gathered—over-sampled—along each dimension.

Multiple Sampling

The process of pixelation is repeated in order to build a system of pixel arrays that can be used to calculate the values of the pixels in the resulting image. This process is also referred to as multiple sampling or over-sampling. Let this resulting image be represented as a region F that is the same size as R. The resolution of F must be high enough to accurately depict the point of interest I. According to the Nyquist sampling criterion, an individual pixel in F is less than half the size of I. See, e.g., Kamen E W and Heck B S; 1997 Prentice Hall; New Jersey. Therefore, the size of an individual pixel in F is $(\frac{1}{2}*2(1/n))$ or $(1/n)$. That is, the pixelation process is repeated on region R with the origin shifted by an increment that is equal to the size of a pixel in F—$(1/n)$—so that every pixel in F that would be contained in the region defined by the first pixel in $S(0,0)$ becomes the origin for one of the sampling arrays in the system of pixel arrays. Thus, for every value of j and every value of k such that $0<j<n$ and $0<k<n$, the pixelation process is repeated to obtain a sampling array $S(j, k)$. The system of pixel arrays is termed the sampling region or space S and an individual sampling array is termed a layer.

Multiple sampling according to this invention may be performed in alternative ways, as discussed in various sections of this disclosure. For example, sampling or acquisitions may be performed (i) from a given origin, at a predetermined resolution, and by a random increment along orthogonal dimensions; (ii) from the same origin but at a varied resolution; (iii) at the same resolution but with rotated frames or matrixes; or any combinations of (i), (ii), and (iii). In short, therefore, suitable for the methods of the present invention is any process by which a multiplicity of sampling layers may be produced from imaging an object where each layer consists of more than redundant image information vis-à-vis the rest of the layers; to wit, no single image layer may be deduced from the rest of the layers.

Initial Reconstruction by Consolidating Multi-Sampled Layers

In this process the value of any pixel in F is determined as the average value (the arithmetic mean) of the corresponding pixel in all layers of S. In practice, this is computed as the summation of all layers of S projected into the region F and divided by the number of layers. Taking arithmetic means is an approach of consolidating multi-sampled layers of S in certain embodiments of this invention. In other embodiments, various other approaches may be used, including, e.g., taking harmonic means, geometric means, or simple summations, or applying any other mathematical computations or artificial intelligent procedures by which a single value is deduced as a function (e.g., an arithmetical function or a heuristic function) of the corresponding pixel values in each layer of S. This process yields a final region F that contains all of the information in S.

Final Reconstruction Using a Filtering Mask

The reconstruction artifact can be defined as the response of the forgoing sampling, overlaying, and consolidating process to a single point in the original region R. In terms of digital signal processing (DSP), for example, it is an impulse response function that can also operate as a filtering mask. In this example, thus, the point response function is a square region with the highest intensity in the center and the lowest intensity on the corners. The size of the region is one pixel in F smaller than two pixels in S, or $(2n-1)$ pixels in F. Depending on the ways by which multi-sampled layers are produced according to this invention in various embodiments, the relative intensities of the point response may vary, as the artifacts are similarly defined by the response of this sampling, overlaying, and consolidating process on a single point within one pixel in F. If the impulse point used to generate this function is a unit impulse with intensity of one, the impulse response function for an over-sampling factor of three, m(3), would be as follows.

$$m_{(3)} = \begin{bmatrix} 1/9 & 2/9 & 3/9 & 2/9 & 1/9 \\ 2/9 & 4/9 & 6/9 & 4/9 & 2/9 \\ 3/9 & 6/9 & 9/9 & 6/9 & 3/9 \\ 2/9 & 4/9 & 6/9 & 4/9 & 2/9 \\ 1/9 & 2/9 & 3/9 & 2/9 & 1/9 \end{bmatrix}$$

Generation of this artifact by the afore-described reconstruction is mathematically equivalent to performing the convolution of R (sampled with the resolution in F) with the impulse response function as defined by the over-sampling factor m(n) and the predetermined acquisition scheme or matrix. Since convolution in the spatial domain is equivalent to multiplication in the Fourier domain, division in the Fourier domain after the afore-described reconstruction may remove such artifact:

Given $I(w,z)=R(w,z)M(w,z)$, we have:

$R(w,z)=I(w,z)/M(w,z)$, where I is the reconstructed image space obscured by the artifact and (w,z) designates that the function is represented in Fourier space. This division in Fourier space by the impulse response function concludes the back pixelation processing and produces a final image that has desired higher resolution in F.

The aforementioned steps may be similarly applied to three-dimensional images, an example of which is set forth infra in Example 4.

Prospective and Retrospective Applications of the Back Pixelation Technique

As discussed supra, the back pixelation process may be applied to reduce pixel or voxel size. Reconstructing image data from over-sampled layers permits recapture of the image information contained in a region that is smaller than the original pixel or voxel in size. The process may be employed using the same field of view (FOV) but a different matrix size; a different FOV but the same matrix; or a different FOV and a different matrix size. It is important that the pixels or voxels are not identically super-imposed such that redundant image data is gathered by multiple sampling. That is, the multiple sampling and overlaying is with a shift and/or by an increment, in order to allow different spatial data to be captured by each sampling or acquisition. In certain embodiments, the increment remain constant; in other embodiment, the increment varies throughout the sampling process. In a preferred embodiment, the increment has a size that is smaller than the size of the original pixel or voxel. The increment may be taken, in various embodiments, on one or more dimensions; i.e., along the x axis, y axis, and/or z axis.

The relative positions of the over-sampled image layers, i.e., the organization and/or scheduling of the increments provides a linkage between the resulting image and the matrix position. Given such information, the pixelation process may be applied both retrospectively and prospectively. Retrospectively, starting with a plurality of pre-acquired images, which are capable of overlaying one another by an increment, the back pixelation reconstruction may be performed on these images as discussed supra, by taking arithmetic means therefrom (or performing any other suitable mathematical computations and artificial intelligence procedures according to this invention), and removing artifacts using a filtering mask. The final image produced would therefore have a higher resolution or lower pixel/voxel size, owing to the size of the increment and the position shift of the matrix.

Prospectively, in order to produce an image with a desired resolution or a desired pixel/voxel size, one may design and start with an acquisition matrix, and perform multiple acquisitions according to the organization and scheduling of the acquisition matrix. Using the back pixelation technique, the final image would be constructed from multiple overlaid images acquired in each acquisition—whose acquisition resolution may be lower than the desired resolution of the final image—by taking arithmetic means therefrom (or performing any other mathematical computation and artificial intelligence procedures according to this invention) and removing artifacts using a filtering mask. Because the acquisition matrix is pre-designed, the pattern of the multiple overlaying or the super-imposition is predetermined. Consequently, the resulting resolution of the final image may be controlled by the detailed design of the acquisition matrix. In certain embodiments, the matrix consists of even-sized or equally-spaced units; in other embodiment, the matrix consists of one or more uneven-sized or unequally-spaced units. In a preferred embodiment, the unit size of the acquisition matrix is smaller than the size of the pixel or voxel used during the multiple acquisitions. In various embodiments, the pixel or voxel size of the final image may be computed based on the unit size and the pattern of the acquisition matrix. In some embodiments, the pixel or voxel size of the final image is equal to the unit size of the acquisition matrix, an integral number of times of the unit size, or a decimal number of times of the acquisition matrix.

The prospective determination of the acquisition matrix—the size of the overlapping increment (unit size of the matrix) and the overlapping scheme (scheme of the matrix)—may be adaptive in alternative embodiments of this invention. That is, the matrix may be determined in real time using artificial intelligence selection based on degree changes between image data sets. For example, suppose the initial overlapping increment of the second acquisition is 10% of the pixel size on a dimension, the resultant digital image data set from the second acquisition may be assessed for variance from the initial digital image data set based on any number of comparators (factors or parameters to be compared), such as raw pixel or voxel data, phase shift information (phase data), k-space data, S/N per pixel, or voxel location. If the second and first image data sets are similar (by predetermined statistical standards) and without significant variance, the subsequent (e.g., the third) acquisition(s) may be augmented by applying a greater overlapping increment or a greater shift (i.e. >10%) or, by adjusting to an alternative matrix or overlapping scheme that permits effective procurement of new (different to the earlier acquisitions) image data, as assessed by a significant variance. This adaptive acquisition process thus allows one to achieve an optimal spatial resolution by advantageously taking efficient use of time during acquisitions.

The prospective and retrospective applications of the back pixelation technique may be carried out in any reference coordinates systems, such as a Cartesian coordinates system or a polar coordinate system in various embodiments of this invention. That is, the increment or overlapping increment and the acquisition matrix may be defined in terms of any reference coordinates, such as Cartesian coordinates or polar coordinates. According to this invention, these prospective and retrospective back pixelation methods may be employed on any digital images, which includes, among other things, images produced by a digital scanner, images produced by a digital camera or digital video, and medical images such as MR images, pathological images, histological images, and radiological images. These methods are thus particular useful in medical imaging, movies and video games, teleimage, and any other areas involving the use of digital images.

Improvements on Temporal Resolution

In addition to increasing spatial resolution, the back pixelation technique also enables improvements on temporal resolution according to the present invention. The prospective application of the back pixelation technique using a predetermined acquisition matrix, for example, permits scheduling a spatial image acquisition pattern for multiple acquisitions over time. The temporal resolution of the resulting imaging would be that of the actual acquisition speed of the images. In alternative embodiments, the multiple acquisitions may be adaptive, as described in the preceding subsection. Such methods are particularly useful where temporal considerations are important.

A further enhancement to the adaptive determination of the acquisition matrix or scheme and the temporal scheduling of the acquisitions is the use of a small-scaled initial acquisition(s) (i.e., a preliminary test acquisition) to determine the desired matrix parameters. For example, in advance of a contrast-enhanced MRI study, a smaller contrast media dose (a "test bolus") can be administered prior to the diagnostic larger contrast bolus exam. See, e.g., Earls J P et al. Radiology 1996, 201:705-710. Scanning during the test bolus using a trial matrix (or an assortment of various matrices) may be used as such to determine optimal spatial and temporal resolution for back pixelation acquisition in order to monitor for the desired dynamic change, that is, in this example, the change of contrast media enhancement during the subsequent full diagnostic contrast media dose administration. A preliminary test acquisition(s) may be particularly useful when performed in conjunction with an operator-controlled or subject-dependent intervention or time-referenced change in a clinical diagnostics and/or treatment context, such as the intravascular administration of a test bolus of contrast media, breathing motion, cardiac contraction, and the movement of a structure, etc.

The segmentation of image data into smaller time "packets," therefore, makes it possible to produce higher temporal resolution images during a comparable time period for acquiring a conventional image. It enables the acquisition of high temporal resolution information during the acquisition of a high spatial resolution scan. The segmentation of image data into small time "packets" also facilitates the improved ability to synchronize or gate data acquisition for imaging regions where physiologic motion is a dominant concern. For example, cardiac imaging requires both cardiac and respiratory gating. The back pixelation methods would enable the shortening of the acquisition window per cardiac or respiratory cycle for the minimization of image blurring, thereby improving structural depiction and enabling improved temporal synchronization of image data acquisition for specific periods of the cycle.

It is thus clear that back pixelation methods of this invention improve image resolution both spatially and temporality, and hence allow a better balance between the two. These methods become particular useful where, other than the requirement of a reasonable spatial resolution, a requirement of high temporal resolution is critical; the examples of such situations include imaging contrast enhancement and determining bolus kinetics such as wash-in, time-to-peak, equilibrium, and wash-out times. Contrast media is commonly used in the assessment of vascularity and tissue or tumor perfusion and in the assessment of vessels.

The invention is further described by the following examples, which are illustrative of the invention but do not limit the invention in any manner.

Image Data Transmission

The back pixelation technique may also be used for transmission of image data according to the present invention. Advantageous reduction of data volume may be achieved by reducing or decomposing an image data set into smaller lower resolution data packets for transmission. That is, for example, a two-dimensional image of an object may be decomposed through back pixelation process into a plurality of images taken from the object, each image in the plurality is capable of overlaying one other images in the plurality at an increment. The images in the plurality may be transmitted separately, one at a time. Depending on the transmission capacity and the requirement on resultant image resolution, one may choose to transmit only part of the plurality (hence achieve lower image resolution) or the entire plurality (hence achieve better resolution, same as or similar to the resolution of the original image). An intermediate image may then be derived as its pixel values are computed from the values of the corresponding pixels in the transmitted images in the plurality. Subsequently, a resultant two-dimensional image having a second pixel size may be produced by dividing, in the Fourier domain, the intermediate image by a filtering function; the filter function is capable of representing artifacts from the multiple overlaying.

The filter function is a point response function according to one embodiment of the invention. The computing may be performed by taking arithmetic means in some embodiments. In other embodiments, the computing is performed by a heuristic function or an arithmetic function according to suitable mathematics and artificial intelligence procedures.

Image data transmission and data acquisition may be coupled in real time according to this invention. For example, a two-dimensional image of an object may be produced and transmitted from multiple acquisitions using a two-dimensional acquisition matrix. The acquisition matrix and the transmission process defines the resulting pixel size of the two-dimensional image. First, a multiplicity of images from the object are acquired, one at a time, by shifting one or more units in the acquisition matrix. Second, the multiplicity of images are transmitted, one at a time. Third, a intermediate image is derived as its pixel values are computed from the pixel values in each transmitted image in the multiplicity. Lastly, the resulting image after transmission is obtained by dividing, in the Fourier domain, the intermediate image by a filtering function; the filter function is capable of representing artifacts from multiple acquisitions.

In this context, the resulting image resolution after transmission may be adjusted on an as needed basis. Image packets containing resolution data may be sent via remote communication to a client where they are reconstructed in real time. Transmission may be halted or stopped once the client determines that the resolution of the reconstructed image from transmitted packets becomes satisfactory. Thus, this procedure enables time efficient data transmission. It in essence can yield a gradually improving image at the receiving end and hence allows early initiation of a subsequent process before completion of the data transmission, which may be critical in medical monitoring and treatment context, for example.

Decomposition of image data based on spatial resolution according to this invention is advantageous over other forms of data segmentation or reduction (e.g., preserve every fourth point or a quadrant of the image data), because the preserved data packet represents an overlay(s) of the entire image data set. If one data packet is lost on transmission, the outcome is an image with a slightly lowered spatial resolution. Whereas, with other data segmentation or reduction schemes, the resultant image may have voids at random areas of the image. Moreover, in such situations, the quality of transmitted image may be readily restored according to the present invention by enabling retransmission of only the lost image data packet.

EXAMPLE 1

Figure 4:
FIG. 4 shows the original image with a size of 256×256, which was subjected to the computer simulation depicted in FIGS. 1, 2, and 3.

A Computer Simulation of Image Reconstruction Using the Back Pixelation Technique A computer simulation was performed, applying the back pixelation technique to reconstruct a MRI image. The original image is shown in FIG. 4. Image data processing is implemented with the C++ programming language. Examples of the C++ source code segments are included in Examples 2 and 3 infra.

Multiple sampling was carried out on the original image with a multiple sampling factor of eight. This simulated data acquisition was implemented using C++ in Example 2 infra. Referring to FIG. 1, images acquired by multiple sampling are overlaid together. It can be noted that the pixels in an image of this resolution are too large to accurately show the detailed features of the structure. The partial volume effect in this instance obscures almost all of the important information contained in the image. The sample space in this simulation contained 64 layers, with an overlapping increment that is equal to one-eighth a pixel in the sampling region.

Figure 2:
FIG. 2 depicts, in the same computer simulation as that of FIG. 1, the resulting intermediate image after image data reconstruction.

Referring to FIG. 2, an intermediate image was derived from the first stage of image data reconstruction. This procedure was coded using C++ in Example 3 infra. Essentially, the arithmetic mean of the corresponding pixel values for all images from multiple sampling is taken and assigned as the value of each pixel. The resulting intermediate image shows an improvement in the quality of information contained therein. However, the reconstruction artifact from multiple sampling and overlaying obscures most of the detailed features of the structure.

As a final step, the intermediate image was further processed to remove the reconstruction artifact. A filter mask was generated based on the size of the pixel used in the simulation space, which was equal to the pixel size of the finally reconstructed image. Image restoration was then performed by dividing the intermediate image by the filter mask in the Fourier domain. The procedure was coded using C++ as shown in Example 3 infra. All Fourier transforms were performed using the FFTW routine according to Matteo Frigo and Steven G. Johnson at MIT. See, http://www.fftw.org/. The final reconstructed image is shown in FIG. 3.

Figure 3:
FIG. 3 depicts, in the same computer simulation as that of FIGS. 1 and 2, the final reconstructed image after removing multi-sampling artifacts.

Comparing the image of FIG. 3 to that of FIG. 1, the drastic improvement in image quality is noteworthy. The resolution increase is 64 fold in this situation. It is clear that the image of FIG. 3 shows very little artifact and that it closely resembles the original image of FIG. 4.

EXAMPLE 2

A C++ Source Code Segment Implementing Simulated Acquisition or Sampling

```
// AqLayer.cpp: implementation of the CAqLayer class.
#include "stdafx.h"
#include "CartBP.h"
#include "AqLayer.h"
#ifdef _DEBUG
#undef THIS_FILE
static char THIS_FILE[ ]=__FILE__;
#define new DEBUG_NEW
#endif
CAqLayer::CAqLayer( )
{
    m_array = NULL;
    m_xOffset=m_yOffset=0;
    m_xPxls=m_yPxls=0;
    m_xSize=m_ySize=0;
}
CAqLayer::~CAqLayer( )
{
    if(m_array != NULL)
        free(m_array);
}
void CAqLayer::CreateLayer(CTrueSpace* truespace,int nXLayers, int nYLayers, int i/*Layer index*/)
{
    int nPxls = truespace->m_nPxls;
    m_ySize = nYLayers; //size of a layer pixel in truepsace pixels
    m_xSize = nXLayers;
    m_yPxls = nPxls/nYLayers+1; //# of pixels in Y direction
    m_xPxls = nPxls/nXLayers+1; //# of pixels in X direction
    m_xOffset = (int)-fmod((double)i,(double)nXLayers);
    m_yOffset = (int)-floor((double)i/(double)nXLayers);
    m_array = (float*)malloc(m_yPxls*m_xPxls*sizeof(float));
    if (m_array == NULL)
    {
        cout<<"insufficient memory to simulate acquisition layer "<<i<<endl;
        return;
    }
    float sum,count; //temporary colculation variables for averagin underlying pixels
```

-continued

```
        for(int Lx=0; Lx < m_xPxls; Lx++){
        for(int Ly=0; Ly < m_yPxls; Ly++) //loop indecis Lx and Ly throug layer array
        {
            sum = 0;
            count = 0;
            for(int
x=(m_xSize*Lx+m_xOffset);x<(m_xSize*Lx+m_xOffset+m_xSize);x++){
            for(int y=(m_ySize*Ly+m_yOffset);y<(m_ySize*Ly+m_yOffset+m_ySize);y++)
            {
                if (x > nPxls-1 || y > nPxls-1||x<0||y<0)
                    sum += 0;                  else
                    sum+=truespace->m_array[y*nPxls+x]; //add position (x,y) using
pointer math
                count++;
            }//end y for loop
            }//end x for loop
            m_array[Ly*m_xPxls+Lx] = (float)(sum/count);
        }//end Ly for loop
        }//end Lx for loop
}
BOOL CAqLayer::SaveFile(CString filename,int index,BOOL query)
{
    if (query) //then ask if filename is correct
    {
        char response[10];
        cout <<filename<<"\nIs this the correct filename and path?\n(yes/no/quit):";
        cin >> response;
        cin.ignore(10,'\n'); //check to see if standard name is satisfactory
        if (response[0]=='q' || response[0]=='Q')
            return FALSE; //notice to terminate file saving
        else if (response[0]=='n' || response[0]=='N')
        {
            CString name = "layer" + (CString)index;
            CFileDialog FSaveDlg(FALSE,"raw",name,OFN_HIDEREADONLY|
OFN_OVERWRITEPROMPT|OFN_NOREADONLYRETURN,"raw data files
(*.raw)|*.raw||");
            FSaveDlg.DoModal( ); //run the file save dialog box
            filename = FSaveDlg.GetPathName( );
        }
    }
    TRY{
        CFileException e;
        BOOL IsOpen = FALSE;
        CFile savefile;
        IsOpen = savefile.Open(filename,CFile::modeCreate|CFile::modeWrite,&e);
        if (!IsOpen) //file did not open for writing
        {
            cout <<"\nCould not open file for writing."<<endl;
            return FALSE;
        }
        int filesize = m_xPxls*m_yPxls;
        byte *buffer;
        buffer = (byte*)malloc(filesize);
        if (buffer == NULL)
        {
            cout<<"Insufficient memory."<<endl;
            return FALSE;
        }
        for (int i=0;i<filesize;i++)
            buffer[i] = (byte)m_array[i];
        }
        savefile.Write(buffer,filesize);
        if (IsOpen)
        {
            savefile.Close( );
            cout<<"Layer "<<index<<" Saved as \n"<<filename;
            cout<<"\n rows:"<<m_yPxls<<" columns:"<<m_xPxls<<endl;
        }
        free(buffer);
    }//end TRY
    CATCH( CFileException, e)
    {
        CString strMessage;
        strMessage.Format("Error during File Write: %d",
            e->m_lOsError);
        AfxMessageBox(strMessage);
    }
    END_CATCH
    return TRUE;
```

```
}
void CAqLayer::Clean( )
{
    if (this->m_array!= NULL)
    {
        free(this->m_array);
        m_array = NULL;
    }
    m_xOffset = 0;
    m_yOffset = 0;
    m_xPxls = 0;
    m_yPxls = 0;
    m_xSize = 0;
    m_ySize = 0;
}
```

EXAMPLE 3

A C++ Source Code Segment Implementing Simulated Image Reconstruction and Filtering

```
#include "stdafx.h"
#include "CartBP.h"
#include "SimSpace.h"
#include <rfftw.h>
#ifdef _DEBUG
#undef THIS_FILE
static char THIS_FILE[ ]=__FILE__;
#define new DEBUG_NEW
#endif
CSimSpace::CSimSpace( )
{
    m_LayerCount=0;
    m_array = NULL;
    m_xOrigin = m_yOrigin = 0;
    m_xPxls = m_yPxls = 0;
    IsAvg = FALSE;
    IsSharp = FALSE;
    IsHarmonic = FALSE;
}
CSimSpace::~CSimSpace( )
{
    if (m_array != NULL)
        free(m_array);
}
void CSimSpace::Create(int nPxls, int xpad, int ypad)
{
    /*
    all of the reconstruction data in process.*/
    if (m_array != NULL)
        Clean( );
    m_xPxls = nPxls+2*xpad;
    m_yPxls = nPxls+2*ypad;
    m_xOrigin = xpad;
    m_yOrigin = ypad;
    m_array = (double*)malloc(m_xPxls*m_yPxls*sizeof(double));
    if (m_array == NULL)
    {
        cout<<"Insufficient memory to perform reconstruction."<<endl;
        Clean( );
    }
    else
    {
    for (int i=0; i < m_xPxls*m_yPxls; i++)
        m_array[i] = 0;
    }
}
BOOL CSimSpace::AddLayer(CAqLayer Layer)
{
    if(IsAvg)
    {
```

-continued

```
            cout<<"Simulation space is currently unable to comply."<<endl;
            return FALSE;
        }
    if(Layer.m__array!=NULL)
        if(Layer.m__xPxls!=(m__xPxls-Layer.m__xSize*2)/Layer.m__xSize+1|| //size of x dimension
is compatible
            Layer.m__yPxls!=(m__yPxls-Layer.m__ySize*2)/Layer.m__ySize+1|| //size of y
dimension is compatible
            sizeof(Layer.m__array)==0) //the layer is actually holding information
        {
            cout<<"Incompatible Layer for Reconstruction."<<endl;
            return FALSE;
        }
    if (IsAvg)
    {
        cout<<"Reconstruction has already been averaged."<<endl;
        return FALSE;
    }
    int Iindex =0,Lindex; //image (reconstruction) index and Layer (acquisition) index
    for (int j=0; j < Layer.m__yPxls; j++){
    for (int i=0; i < Layer.m__xPxls; i++){
        for (int x = i*Layer.m__xSize+Layer.m__xOffset+Layer.m__xSize;
            x < i*Layer.m__xSize+Layer.m__xOffset+2*Layer.m__xSize; x++){
        for (int y = j*Layer.m__ySize+Layer.m__yOffset+Layer.m__ySize;
            y < j*Layer.m__ySize+Layer.m__yOffset+2*Layer.m__ySize; y++){
                Iindex = y*m__xPxls+x;
                Lindex = j*Layer.m__xPxls+i;
                if(IsHarmonic)
                {
                    if (Layer.m__array[Lindex] == 0)
                        Layer.m__array[Lindex] = (float)0.0000001;
                    m__array[Iindex] += (double)1/(Layer.m__array[Lindex]);
                }
                else
                    m__array[Iindex] += (double)Layer.m__array[Lindex];
        }
        }//end inner 2D loop
    }
    }//end outer 2D loop
    m__LayerCount ++;
    return TRUE;
}
BOOL CSimSpace::SetMask(void)
{
    if(!IsAvg) //test to see that primary reconstruction is complete
    {
        cout<<"Primary image reconstruction is incomplete, cannot build mask."<<endl;
        return FALSE;
    }
    if(maskArray != NULL)
        free(maskArray);
    maskArray = (double*)malloc(m__xPxls*m__yPxls*sizeof(double));
    if (maskArray == NULL)
    {
        cout<<"Insufficient memory to create filter mask."<<endl;
        return FALSE;
    }
    for(int i=0;i<m__xPxls*m__yPxls;i++)
        maskArray[i] = 0;
    double maskmax = (double)m__LayerCount;
    int index=0; //insertion point into array
    int x,y; //looping for loop indecis
    int xmin,xmax,ymin,ymax; //looping limits for extent of nonzer portion of mask
    xmin = m__xPxls/2-m__xOrigin+1;
    xmax = m__xPxls/2+m__xOrigin;
    ymin = m__yPxls/2-m__yOrigin+1;
    ymax = m__yPxls/2+m__yOrigin;
    int xoff,yoff; //offsets from center
    for(x=xmin; x < xmax; x++) //x offset variable
    for(y=ymin; y < ymax; y++){ //y offset variable
        index = y*m__xPxls+x;
        xoff = abs(m__xPxls/2-x);
        yoff = abs(m__yPxls/2-y);
        maskArray[index] = (double)(m__xOrigin-xoff)*(m__yOrigin-yoff);
        if(IsHarmonic)
            maskArray[index] += (double)((maskmax-maskArray[index])/0.0000001);
    }//end 2D loop
    for(x=xmin;x < xmax;x++)
    for(y=ymin;y < ymax;y++){
```

```
                index = y*m_xPxls + x;
                maskArray[index] /= maskmax;
                if(IsHarmonic)
                    maskArray[index] = 1/maskArray[index];
        }//end 2D loop
        return TRUE;
}
void CSimSpace::Clean( )
{
        if (m_array != NULL)
        {
                free(m_array);
                m_array = NULL;
        }
        m_xOrigin = m_yOrigin = 0;
        m_xPxls = m_yPxls = 0;
        m_LayerCount = 0;
        if (maskArray != NULL)
        {
                free(maskArray);
                maskArray = NULL;
        }
        //reset flags
        IsAvg = IsSharp = FALSE;
        if (maskArray!=NULL)
        {
                free(maskArray);
                maskArray = NULL;
        }
        IsSharp = FALSE;
//      IsHarmonic = FALSE;//cleaning this flag disturbs the logic flow
}
BOOL CSimSpace::FileSave(CString filepathname)
{
        char response[10];
        cout <<filepathname<<"\nIs this the correct filename and path?\n(yes/no):";
        cin >> response;
        cin.ignore(10,'\n');
        if (response[0]=='n' || response[0]=='N')
        {
                CString name;
                if(IsSharp)
                        name = "restored";
                else
                        name = "reconstructed";
                CFileDialog FSaveDlg(FALSE,"raw",name,OFN_HIDEREADONLY|
                        OFN_OVERWRITEPROMPT|OFN_NOREADONLYRETURN,"raw
data files (*.raw)|*.raw||");
                FSaveDlg.DoModal( ); //run the file save dialog box
                filepathname = FSaveDlg.GetPathName( );
        }
        TRY{
                CFileException e;
                BOOL IsOpen = FALSE;
                CFile savefile;
                IsOpen = savefile.Open(filepathname,CFile::modeCreate|CFile::modeWrite,&e);
                if (!IsOpen) //file did not open for writing
                {
                        cout <<"\nCould not open file for writing."<<endl;
                        return FALSE;
                }
                int filesize = m_xPxls*m_yPxls;
                byte *buffer;
                buffer = new byte[filesize];
                for (int i=0;i<filesize;i++)
                {
                        buffer[i] = (byte)m_array[i];
                }
                savefile.Write(buffer,filesize);
                if (IsOpen)
                {
                        savefile.Close( );
                        cout<<"Reconstruction Saved as \n"<<filepathname;
                        cout<<"\n rows:"<<m_yPxls<<" columns:"<<m_xPxls<<endl;
                }
                delete buffer;
        }//end TRY
        CATCH( CFileException, e )
        {
```

```
            CString strMessage;
            strMessage.Format("Error during File Write: %d",
                e->m_lOsError);
            AfxMessageBox(strMessage);
        }
        END_CATCH
        return TRUE;
}
void CSimSpace::Average( )
{
    int index;
    for(int x=0; x < m_xPxls; x++){
    for(int y=0; y < m_yPxls; y++){
        index = y*m_xPxls+x;
        if(IsHarmonic) //then multiply by number of layers
        {
            m_array[index] /= m_LayerCount;
            m_array[index] = 1/m_array[index];
        }
        else    //is arithmetic, divide by number of layers
            m_array[index] /= m_LayerCount;
    }}
    IsAvg = TRUE;
}
BOOL CSimSpace::Restore( )
{
    fftw_real *mask/*filter mask*/, *final, *rough;/*image before restoration*/
    fftw_complex *M,/**F,*/*R;
    rfftwnd_plan plan,invplan; //sturcture used to prepare for FFT
    fftw_real scale = 1.0/(m_xPxls*m_yPxls); //scaling factor
    int i,j,ij; //indexing variables
    mask = maskArray;
    rough = m_array;
    final = m_array;
    M = (fftw_complex*)malloc(m_yPxls*(m_xPxls/2+1)*sizeof(fftw_complex));
(fftw_complex*)malloc(m_yPxls*(m_xPxls/2+1)*sizeof(fftw_complex));
    R = (fftw_complex*)malloc(m_yPxls*(m_xPxls/2+1)*sizeof(fftw_complex));
    if (M==NULL||R==NULL)
    {
        cout<<"Insufficient memory to perform image restoration."<<endl;
        return FALSE;
    }
    plan = rfftw2d_create_plan(m_yPxls,m_xPxls,FFTW_REAL_TO_COMPLEX,
                                                FFTW_ESTIMATE);
    invplan = rfftw2d_create_plan(m_yPxls,m_xPxls,FFTW_COMPLEX_TO_REAL,
                                                FFTW_ESTIMATE);
    double imax = 0, mmax=0;double imin = 20000000000000,mmin = imin;
    for(i=0;i<m_xPxls;i++)
    for(j=0;j<m_yPxls;j++)
    {
        ij = j*m_xPxls+i;
        if (rough[ij] > imax)
            imax = rough[ij];
        if (rough[ij] < imin)
            imin = rough[ij];
        if (mask[ij] > mmax)
            mmax = mask[ij];
        if (mask[ij] < mmin)
            mmin = mask[ij];
    }
    rfftwnd_one_real_to_complex(plan,mask,M);
    rfftwnd_one_real_to_complex(plan,rough,R);
    double magR,magF,magM,phaR;        //perform pointwise division of complex numbers so
that R = R/M
    for(i=0;i<m_xPxls/2;i++)
    for(j=0;j<m_yPxls;j++)
    {
        ij = j*(m_xPxls/2+1)+i;
        magR = sqrt(R[ij].re*R[ij].re+R[ij].im*R[ij].im);
        magM = sqrt(M[ij].re*M[ij].re+M[ij].im*M[ij].im);
        phaR = atan2(R[ij].im,R[ij].re);
        if (magM > 0.001)
            magF = magR/magM;
        R[ij].re = magF*cos(phaR);
        R[ij].im = magF*sin(phaR);
    }
    rfftwnd_one_complex_to_real(invplan, R, final);
    double max = 0;double min = 20000000000000;
    for(i=0;i<m_xPxls;i++)
```

```
    for(j=0;j<m_yPxls;j++)
    {
        ij = j*m_xPxls+i;
        final[ij]*=scale;
        if (final[ij] > max)
            max = final[ij];
        if (final[ij] < min)
            min = final[ij];
    }
    for(i=0;i<m_xPxls;i++)
    for(j=0;j<m_yPxls;j++)
    { //(value-min offset)/(current range)*(desired range)
        ij = j*m_xPxls+i;
        final[ij] = ((final[ij]-min)/(max-min))*(imax-imin);
    }
    rfftwnd_destroy_plan(plan);
    rfftwnd_destroy_plan(invplan);
    free(R);
    free(M);
    IsSharp = TRUE;
    return TRUE;
}
```

EXAMPLE 4

A Brief Mathematical Description of the Back Pixelation Technique Applied to Three-Dimensional Images Consider a point in space P at an unknown location within a region V that is defined by the points (x1,y1,z1) and (x2,y2, z2). Suppose the intensity of point P is some value Ip and the intensity of every other point in space is 0.

The region V is sampled with a cuboidal sample region S of size 1 in such a way that S just overlaps V at point (x1,y1,z1) by some value dl. This is sample position (1,1,1). A new region of space C is created which is to be used for computing the reconstruction of V that is of the size V+2l in each dimension. In this region of space at sample location (0,0,0), the sample region would be in the extreme near bottom left corner of C. At the final sample location (x2+1, y2+1, z2+1), the sample region would be in the extreme far upper right corner of C. Every point in C is assigned a value of 0.

The average density of the sample region S is measured and added to every point in C that corresponds to the sample region S. If P is within S then the density will be Is=Ip/1^3. If P is not within S the density will be 0. The sampling and reconstruction computation process here is performed by stepping the sample region S through each sample location using step sizes of dl. By way of pseudo-code, the following routine illustrates this process:

Where zn is the number of steps to cross the region in the z axis, yn the y axis, xn the x axis,

```
For (z=0; z<=zn; z++)
    For (y=0; y<=yn;y++)
        For (x=0;x<=xn;x++)
            {Sample the average density of S and add that value to the corresponding points in C.}
```

As a result, the final reconstructed region C has a roughly spherical region of non-zero intensity, the radius of which spherical region is 1 and the intensity value on the edge of which spherical region is Is=Ip/1^3. Further, the intensity at the center of the region will be Is* (the number of samples over P), such that Icenter=Is 8 (1/dl)^3. Also, the center of the spherical region corresponds to the location of point P, whose intensity can be calculated as Ip=Icenter*dl^3.

Therefore, this process in the three-dimensional space, like that in the two-dimensional space discussed supra, may increase image resolution without increasing the magnetic field strength. The resulting artifact around a point in space would be a three-dimensional Gaussian blur, which can be removed through the aforementioned filtering process that is applied to two-dimensional images extrapolated to three-dimensional data sets.

It is to be understood that the description, specific examples and data, while indicating exemplary embodiments, are given by way of illustration and are not intended to limit the present invention. All references cited herein for any reason, are specifically and entirely incorporated by reference. Various changes and modifications within the present invention will become apparent to the skilled artisan from the discussion, disclosure and data contained herein, and thus are considered part of the invention.

The invention claimed is:

1. A method for improving resolution of a two-dimensional image acquired from an object at a first pixel size, comprising one or more computers implementing:

defining a sampling region for producing said image at a second pixel size, said second pixel size being no larger than said first pixel size;

sampling, with an overlapping increment, said sampling region thereby producing a multiplicity of sample layers, said overlapping increment being no larger than said first pixel size thereby determining said second pixel size, wherein said overlapping increment is equal to 1/n and wherein n is determined by a minimum resolution that accurately displays said image at the second pixel size;

obtaining values of the pixels of the second pixel size in each of the multiplicity of sample layers;

computing the value of each pixel of said second pixel size from the values of the corresponding pixels in the multiplicity of the sample layers, thereby producing an intermediate image; and dividing, in the Fourier domain, said intermediate image by a filtering function thereby producing said image at the second pixel size, said filter function representing artifacts from the multiple sampling.

2. The method of claim 1, wherein said second pixel size is equal to said overlapping increment.

3. The method of claim 1, wherein said second pixel size is equal to said first pixel size divided by said multiplicity.

4. A method for improving resolution of a three-dimensional image acquired from an object at a first voxel size, comprising one or more computers implementing:
- defining a sampling space for producing said image at a second voxel size, said second voxel size being no larger than said first voxel size;
- sampling, with an overlapping increment, said sampling space thereby producing a multiplicity of sample areas, said overlapping increment being no larger than said first voxel size thereby determining said second voxel size, wherein said overlapping increment is equal to 1/n and wherein n is determined by a minimum resolution that accurately displays said image at a second pixel size;
- obtaining values of the voxels of the second voxel size in each of the multiplicity of sample areas;
- computing the value of each voxel of said second voxel size from the values of the corresponding voxels in the multiplicity of the sample areas, thereby producing an intermediate image; and
- dividing, in the Fourier domain, said intermediate image by a filtering function thereby producing said image at the second voxel size, said filter function representing artifacts from the multiple sampling.

5. The method of claim 4, wherein said second voxel size is equal to said overlapping increment.

6. The method of claim 4, wherein said second voxel size is equal to said first voxel size divided by said multiplicity.

7. The method of claim 1, wherein said filter function is a point response function.

8. The method of claim 7, wherein said point response function is defined by a multiple sampling factor which is equal to said multiplicity.

9. The method of claim 1, wherein the sampling is performed with an overlapping increment having a varied size.

10. The method of claim 1, wherein the sampling is performed with an overlapping increment having a fixed size.

11. The method of claim 1, wherein said overlapping increment is taken along one or more dimensions.

12. The method of claim 11, wherein said overlapping increment is taken equally on one or more dimensions.

13. The method of claim 11, wherein said overlapping increment is taken unequally on one or more dimensions.

14. The method of claim 12, wherein said overlapping increment is taken angularly.

15. The method of claim 1, wherein said overlapping increment is defined in terms of Cartesian coordinates or polar coordinates.

16. A method for improving resolution of a two-dimensional image of an object from a plurality of images taken from said object at a first pixel size, wherein each image in said plurality is overlaying one other images in said plurality at an increment, wherein said increment is no larger than said first pixel size, said method comprising one or more computers implementing:
- defining a region for producing said two-dimensional image at a second pixel size, said second pixel size being determined by said increment, wherein said increment is equal to 1/n and wherein n is determined by a minimum resolution that accurately displays said two-dimensional image at a second pixel size;
- obtaining values of the pixels of the second pixel size in each image in said plurality;
- computing the value of each pixel of said second pixel size from the values of the corresponding pixels in the plurality, thereby producing an intermediate image; and
- dividing, in the Fourier domain, said intermediate image by a filtering function thereby producing said two-dimensional image at the second pixel size, said filter function representing artifacts from the multiple overlaying.

17. The method of claim 16, wherein each image in said plurality overlays one other image in said plurality at an increment having a fixed size and wherein said second pixel size is equal to said increment.

18. The method of claim 16, wherein each image in said plurality overlays one other image in said plurality at an increment having a varied size and wherein said second pixel size is equal to the smallest of said increment.

19. A method for improving resolution of a three-dimensional image of an object from a plurality of images taken from said object at a first voxel size, wherein each image in said plurality is overlaying one other images in said plurality at an increment, wherein said increment is no larger than said first voxel size, said method comprising one or more computers implementing:
- defining an area for producing said three-dimensional image at a second voxel size, said second voxel size being determined by said increment, wherein said increment is equal to 1/n and wherein n is determined by a minimum resolution that accurately displays said three-dimensional image at a second voxel size;
- obtaining values of the voxels of said second voxel size in each image in said plurality;
- computing the value of each voxel of said second pixel size from the values of the corresponding voxels in the plurality, thereby producing an intermediate image; and
- dividing, in the Fourier domain, said intermediate image by a filtering function thereby producing said three-dimensional image at the second voxel size, said filter function representing artifacts from the multiple overlaying.

20. The method of claim 19, wherein each image in said plurality overlays one other image in said plurality at an increment having a fixed size and wherein said second voxel size is equal to said increment.

21. The method of claim 19, wherein each image in said plurality overlays one other image in said plurality at an increment having a varied size and wherein said second voxel size is equal to the smallest of said increment.

22. The method of claim 16, wherein said filter function is a point response function.

23. The method of claim 22, wherein said point response function is defined by a multiple overlaying factor which is equal to said plurality.

24. The method of claim 16, wherein said overlaying is performed along one or more dimensions.

25. The method of claim 24, wherein said overlaying is performed equally on one or more dimensions.

26. The method of claim 24, wherein said overlaying is performed unequally on one or more dimensions.

27. The method of claim 25, wherein said overlaying is performed angularly.

28. The method of claim 16, wherein said increment is defined in terms of Cartesian coordinates or polar coordinates.

29. A method for producing a two-dimensional image of an object from multiple acquisitions using a two-dimensional acquisition matrix, wherein said acquisition matrix defines the resulting pixel size of said two-dimensional image, said method comprising one or more computers implementing:

acquiring, one at a time, a multiplicity of images from said object by shifting one or more units in said acquisition matrix, wherein the size of the one or more units is equal to 1/n and wherein n is determined by a minimum resolution that accurately displays said two-dimensional image;

obtaining values of the pixels in each image in said multiplicity;

computing the value of each pixel from the values of the corresponding pixels in the multiplicity, thereby producing an intermediate image; and dividing, in the Fourier domain, said intermediate image by a filtering function thereby producing said two-dimensional image, said filter function representing artifacts from multiple acquisitions.

30. A method for producing and transmitting a two-dimensional image of an object from multiple acquisitions using a two-dimensional acquisition matrix, wherein said acquisition matrix defines the resulting pixel size of said two-dimensional image, said method comprising one or more computers implementing:

acquiring, one at a time, a multiplicity of images from said object by shifting one or more units in said acquisition matrix, wherein the size of the one or more units is equal to 1/n and wherein n is determined by a minimum resolution that accurately displays said two-dimensional image; transmitting, one at a time, said multiplicity of images;

obtaining values of the pixels in each transmitted image in said multiplicity;

computing the value of each pixel from the values of the corresponding pixels in the multiplicity, thereby producing an intermediate image; and dividing, in the Fourier domain, said intermediate image by a filtering function thereby producing said two-dimensional image, said filter function representing artifacts from multiple acquisitions.

31. The method of claim 30, wherein the resulting pixel size of said two-dimensional image is equal to the size of one or more units of said acquisition matrix.

32. A method for producing a three-dimensional image of an object from multiple acquisitions using a three-dimensional acquisition matrix, wherein said acquisition matrix defines the resulting voxel size of said three-dimensional image, said method comprising one or more computers implementing:

acquiring, one at a time, a multiplicity of images from said object by shifting one or more units in said acquisition matrix, wherein the size of the one or more units is equal to 1/n and wherein n is determined by a minimum resolution that accurately displays said three-dimensional image;

obtaining values of the voxels in each image in said multiplicity;

computing the value of each pixel from the values of the corresponding voxels in the multiplicity, thereby producing an intermediate image; and dividing, in the Fourier domain, said intermediate image by a filtering function thereby producing said three-dimensional image, said filter function representing artifacts from multiple acquisitions.

33. A method for producing and transmitting a three-dimensional image of an object from multiple acquisitions using a three-dimensional acquisition matrix, wherein said acquisition matrix defines the resulting voxel size of said three-dimensional image, said method comprising one or more computers implementing:

acquiring, one at a time, a multiplicity of images from said object by shifting one or more units in said acquisition matrix, wherein the size of the one or more units is equal to 1/n and wherein n is determined by a minimum resolution that accurately displays said three-dimensional image;

transmitting, one at a time, said multiplicity of images;

obtaining values of the voxels in each transmitted image in said multiplicity;

computing the value of each voxel from the values of the corresponding voxels in the multiplicity, thereby producing an intermediate image; and dividing, in the Fourier domain, said intermediate image by a filtering function thereby producing said two-dimensional image, said filter function representing artifacts from multiple acquisitions.

34. The method of claim 33, wherein the resulting voxel size of said three-dimensional image is equal to the size of one or more units of said acquisition matrix.

35. The method of claim 33, wherein said acquisition matrix comprises equally-spaced units.

36. The method of claim 33, wherein said acquisition matrix comprises unequally-spaced units.

37. The method of claim 33, wherein said acquisition matrix is defined in terms of reference coordinates.

38. The method of claim 37, wherein said reference coordinates are Cartesian coordinates or polar coordinates.

39. The method of claim 33, wherein images of said multiplicity of images are acquired at defined time points over a period of time.

40. The method of claim 39, further comprising one or more preliminary test acquisitions for determining the scheduling of said time points.

41. The method of claim 33, wherein said multiplicity of images are acquired, one at a time, by shifting a decimal number of units in said acquisition matrix.

42. The method of claim 33, wherein said filter function is a point response function.

43. The method of claim 42, wherein said point response function is defined by a multiple acquisition factor which is equal to said multiplicity.

44. The method of claim 33, wherein said acquisition matrix is adaptively determined by adjusting the unit size or scheme for the subsequent acquisitions based on assessment of variance for one or more comparators for at least two prior acquisitions.

45. The method of claim 44, wherein the one or more comparators are selected from the group consisting of pixel or voxel data, k-space data, phase data, and signal-to-noise ratio data.

46. The method of claim 33, further comprising one or more preliminary test acquisitions for determining the unit size and scheme of said acquisition matrix.

47. A method for transmitting a two-dimensional image of an object, said image having a first pixel size, the method comprising one or more computers implementing:

decomposing said image into a plurality of images taken from said object, each image in said plurality overlaying one other images in said plurality at an increment;

transmitting, one at a time, at least two images in said plurality;

computing the value of each pixel of an intermediate image from the values of the corresponding pixels in the transmitted images in said plurality; and dividing, in the Fourier domain, said intermediate image by a filtering function thereby producing a resultant two-dimensional image having a second pixel size, said filter function representing artifacts from the multiple overlaying, wherein said increment is equal to 1/n and wherein n is determined by a minimum resolution that accurately displays said resultant two-dimensional image.

48. The method of claim 47, wherein said second pixel size is equal to said first pixel size.

49. A method for transmitting a three-dimensional image of an object, said image having a first voxel size, the method comprising one or more computers implementing:
   decomposing said image into a plurality of images taken from said object, each image in said plurality overlaying one other images in said plurality at an increment;
   transmitting, one at a time, at least two images in said plurality;
   computing the value of each voxel of an intermediate image from the values of the corresponding pixels in the transmitted images in said plurality; and
   dividing, in the Fourier domain, said intermediate image by a filtering function thereby producing a resultant three-dimensional image having a second voxel size, said filter function representing artifacts from the multiple overlaying, wherein said increment is equal to 1/n and wherein n is determined by a minimum resolution that accurately displays said resultant three-dimensional image.

50. The method of claim 49, wherein said second voxel size is equal to said first voxel size.

51. The method of claim 49, wherein said filter function is a point response function.

52. The method of claim 49, wherein all images in said plurality is transmitted.

53. The method of 47, wherein said two-dimensional image is selected from the group consisting of a magnetic resonance image, an image produced by a digital scanner, a pathological image, a histological image, and a radiological image.

54. The method of 49, wherein said three-dimensional image is selected from the group consisting of a magnetic resonance image, an image produced by a digital scanner, an image produced by a digital camera or digital video, a pathological image, a histological image, and a radiological image.

55. The method of claim 49, wherein the computing is performed by taking arithmetic means.

* * * * *